(12) United States Patent
Root

(10) Patent No.: US 8,668,418 B2
(45) Date of Patent: Mar. 11, 2014

(54) DUNNAGE MEANS AND METHOD FOR FILLING A VOID SPACE IN A CONTAINER

(75) Inventor: Jan Root, Zwolle (NL)

(73) Assignee: Storopack Hans Reichenecker GmbH, Metzingen (DE)

( * ) Notice: Subject to any disclaimer, the term of this patent is extended or adjusted under 35 U.S.C. 154(b) by 0 days.

(21) Appl. No.: 13/372,915

(22) Filed: Feb. 14, 2012

(65) Prior Publication Data

US 2012/0294692 A1    Nov. 22, 2012

(51) Int. Cl.
*B61D 45/00*    (2006.01)

(52) U.S. Cl.
USPC .......................................................... 410/119

(58) Field of Classification Search
USPC ........................................... 410/119, 125, 87
See application file for complete search history.

(56) References Cited

U.S. PATENT DOCUMENTS

| | | | | |
|---|---|---|---|---|
| 5,254,074 A | * | 10/1993 | Landers et al. | 493/213 |
| 5,339,602 A | * | 8/1994 | Landers et al. | 53/410 |
| 5,830,780 A | * | 11/1998 | Dennison et al. | 428/68 |
| 5,901,850 A | * | 5/1999 | Jones et al. | 206/522 |
| 6,253,806 B1 | * | 7/2001 | Sperry et al. | 141/314 |
| 6,253,919 B1 | * | 7/2001 | Sperry et al. | 206/522 |
| 6,398,029 B1 | * | 6/2002 | Farison et al. | 206/522 |
| 6,520,332 B1 | * | 2/2003 | Barmore et al. | 206/522 |
| 6,561,236 B1 | * | 5/2003 | Sperry et al. | 141/314 |
| 6,568,013 B2 | * | 5/2003 | Perez et al. | 5/710 |
| 6,569,283 B1 | * | 5/2003 | Sperry et al. | 156/583.2 |
| 6,729,110 B2 | * | 5/2004 | Sperry et al. | 53/503 |
| 6,934,989 B2 | * | 8/2005 | Ledvina et al. | 5/644 |
| 2007/0172326 A1 | | 7/2007 | Sperry | |

FOREIGN PATENT DOCUMENTS

| | | |
|---|---|---|
| DE | 4303712 | 8/1994 |
| DE | 9408451 | 9/1994 |
| EP | 2407344 A1 * | 1/2012 |
| EP | 2407344 A1 | 1/2012 |
| WO | 9814390 | 4/1998 |
| WO | 03078251 | 9/2003 |

OTHER PUBLICATIONS

EP 10 00 7266 European Search Report.

* cited by examiner

*Primary Examiner* — Hilary Gutman
(74) *Attorney, Agent, or Firm* — Wood, Herron & Evans, LLP

(57) ABSTRACT

Dunnage for filling a void space in a container. An inflatable dunnage bag has an inflation valve for inflating the bag with a gas. The inflation valve is a solid member having an elevated portion. An outer surface of the bag is tightly fixed to the solid member along a circumferential sealing area distant from the top of the elevated portion. The top of the elevated portion is a circumferential sealing rim tightly contactable by the outer surface of the bag. The solid member has an inflation opening between the sealing area and the sealing rim. The bag has an inflation opening radially inward of the sealing rim.

19 Claims, 8 Drawing Sheets

DUNNAGE MEANS AND METHOD FOR FILLING A VOID SPACE IN A CONTAINER

The invention relates to a dunnage means and a method for filling avoid space in a container according to the preambles of the independent claims.

Such dunnage means comprise an inflatable bag which is typically filled with air and used to fill void space in containers carrying articles for shipment. When the bag is inflated, the article is wedged between the bag and the walls of the container or between portions of the bag. Thus the article is prevented from moving around in the container while being shipped. An example of such a dunnage means is disclosed in WO 99/52772 A1. A method for inflating a dunnage bag is disclosed in EP 1 109 719 B1.

It is an object of the present invention to provide a dunnage means which can be easily inflated while being arranged in a container, and which is easy and cheap to manufacture.

The invention proposes a dunnage means and a method for filling a void space in a container according to the independent claims. Embodiments of the invention are claimed in the dependent claims. Further important features of the invention are disclosed in this specification and in the attached drawing.

An advantage of the present invention is that it allows easily inflating the inflatable dunnage bag on site while providing a reliable sealing of the gas inside the bag, since the inflation valve provides the function of a simple check valve. The check valve is reliable because it has a solid valve seat, and its design is simple because it uses a wall of the inflatable dunnage bag as movable valve element. While providing said easy inflation and reliable storage of gas inside the dunnage bag, the manufacture of the dunnage means according to the invention is very simple and cost saving. There are only two elements needed to form the dunnage means: the solid member and the inflatable dunnage bag.

In a preferred embodiment, an outer surface of the inflatable dunnage bag is tightly fixed to the solid member along a circumferential sealing area being distant from the top of the hill-type elevated portion extending out of the plane of solid member, the top of the elevated portion comprising a circumferential sealing rim, which is tightly contactable by the outer surface of the inflatable dunnage bag, the solid member comprising an inflation opening arranged between the sealing area and the sealing rim, and the wall of the dunnage bag comprising an opening being arranged radially inwardly of the sealing rim. The elevated portion of the solid member may provide a certain elastic tension to the wall of the dunnage bag, such that it is slightly pressed against the sealing rim. When feeding gas such as air through the inflation opening, the outer surface of the inflatable dunnage bag is elastically stretched and lifted from the sealing rim such that gas can pass through the developing gap between the outer surface of the dunnage bag and the sealing rim and through the opening in the wall of the dunnage bag into the inner volume of the inflatable dunnage bag. When inflation is stopped, the elastic tension of the wall of the dunnage bag and/or the gas pressure inside the dunnage bag press the wall of the dunnage bag onto the sealing rim, thus reliably sealing the inner volume of the dunnage bag against the outer atmosphere.

Attaching the outer surface of the inflatable dunnage bag to the solid member does not require a complex manipulation of the inflatable dunnage bag such as opening and reclosing the bag. Further, the opening in the wall of the bag can be of any shape, such that no specific tool is needed to create this opening.

If a space is provided between the outer surface of the inflatable dunnage bag and the elevated portion between the sealing area and the sealing rim, the sealing effect of the sealing rim is improved, especially the effect of the pressure inside the inflatable dunnage bag.

A slope of the elevated portion which is concavely formed away from the outer surface of the inflatable dunnage bag is a simple method to provide the space between the outer surface of the inflatable dunnage bag and the elevated portion.

In case that a top surface of the elevated portion is concavely formed away from the outer surface of the inflatable dunnage bag, the sealing effect of the sealing rim is further improved, and inflation of the bag is eased.

A volcanic cone shape of the elevated portion can easily be manufactured, for example by molding.

If the sealing area is arranged adjacent to the foot of the elevated portion, the dimensions of the inflation valve are minimized. The same applies if the sealing area is line-like. Additionally, this allows minimizing the portion of the dunnage bag attached to the solid member, such that the flexibility of the dunnage bag when applied to a container is kept to a maximum.

A thin card-type solid member can easily be manufactured for example by punching or molding, and also allows easy manufacturing of the elevated portion. Further, the dimensions remain small such that the dunnage means can be applied also to small containers or containers having only little void space.

A particular advantageous further embodiment of the dunnage means according to the invention comprises a solid member having a connecting portion for fixing the solid member with and fixing it to the wall of a container. This allows first to attach the non-inflated dunnage means to the container and then to place an inflation means for example in a hole in the wall of the container where the inflation opening is lodged to inflate the dunnage means to a desired extent, such that the article is perfectly wedged between the bag and the walls of the container or between portions of the bag and prevented from moving around in the container while being shipped. This allows inflation even after the container has been closed.

A hook or clip as connecting portion can easily be manufactured and allows to be pricked into the substance of a material of the container, e.g. a corrugated board and e.g. into the edge of a hole in the wall of the container.

Manufacturing costs are low when the connecting portion and/or the inflation opening are/is formed when molding or punching the solid member.

If the inflatable dunnage bag has a corner, e.g. a rectangular shape, when not inflated, the solid member can be fixed to the inflatable dunnage bag adjacent to the corner of the inflatable dunnage bag, thus allowing the inflatable dunnage bag to best fill the void space inside the container.

Material costs are low if the solid member and/or the inflatable dunnage bag are/is made of polyethylene. The same applies if the outer surface of the inflatable dunnage bag is sealadly fixed to the solid member along the circumferential sealing area by welding.

The invention also relates to a method for filling a void space in a container, comprising placing a dunnage means having an inflatable dunnage bag and an inflation valve for inflating the dunnage bag with a gas inside the container; closing the container; feeding a gas to the inflation opening in order to fill the inflatable dunnage bag with the gas while measuring a displacement of a wall of the container; stopping feeding the gas when the measured displacement reaches a predetermined value; providing a hole in a wall of the container; connecting the inflation valve of the dunnage means at the hole of the container to the container such that an inflation opening of the inflation valve is located at the hole.

This method allows to exactly and securely position the inflation opening such that inflation from outside the container is reliable and fast. Together with measuring a displacement, this allows to precisely inflate the dunnage bag such that it fills the void space at a desired extent without squeezing too much the article(s) placed in the container, and without damaging the container. Further, it considerably eases filling the void space by a user, since the user must no more estimate the correct level of inflation. Further, more containers can be handled in less time, since it is excluded that a container cannot be closed due to an over-inflated dunnage means. The method is particular useful when applying a dunnage means as described above, since this dunnage means allows a particular safe and reliable inflation even after the container has been closed.

The displacement can be measured using one of ultrasound, infrared, and laser distance measurement. These techniques are proven and sufficiently precise.

The method performs particularly well if a displacement of a center of a top surface of the container is measured.

In another embodiment, connecting the inflation valve with the container comprises pricking a hook arranged at the inflation valve into a substance of a material of the container, preferably into an edge of the hole. By doing so, the inflation valve is securely anchored at the hole.

Other features and advantages of the invention will become apparent from the following detailed description.

Figure 1:
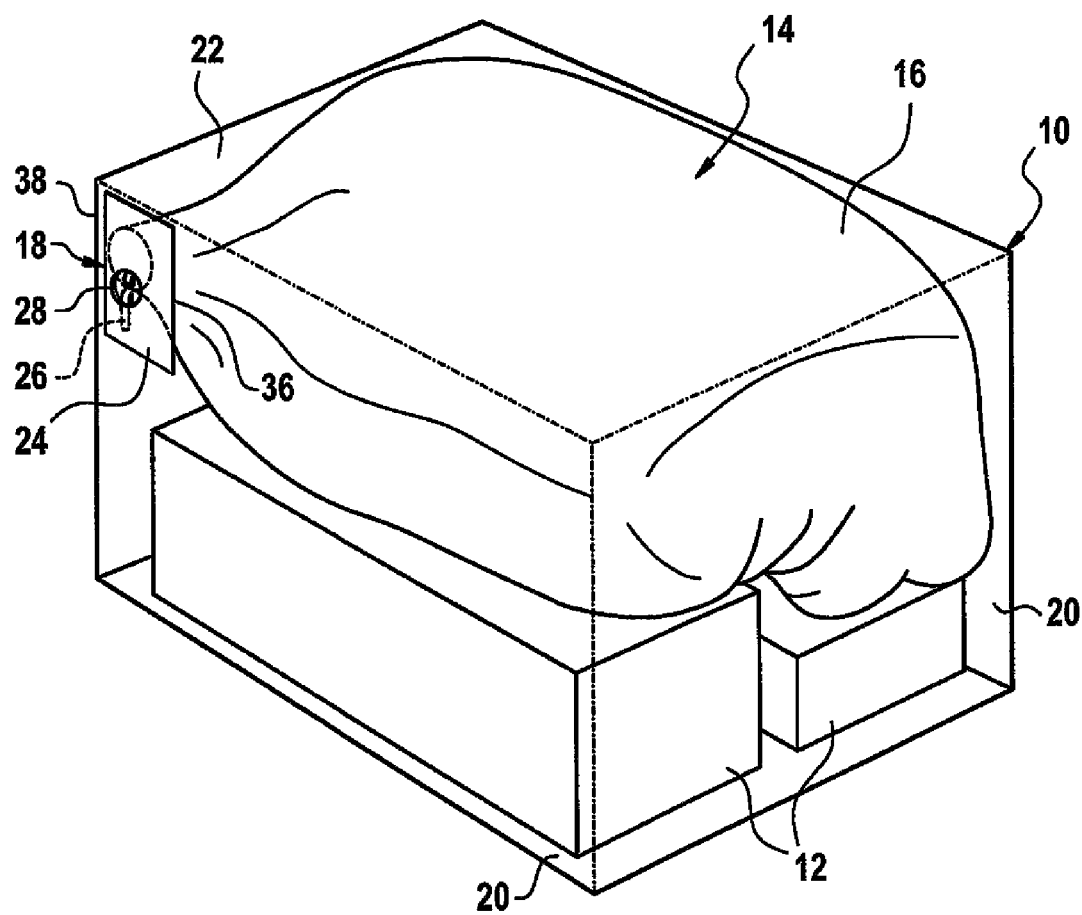
FIG. 1 is an overall perspective view of a container with a dunnage means according to the invention, comprising an inflated dunnage bag and a card-type inflation valve.
Figure 2:
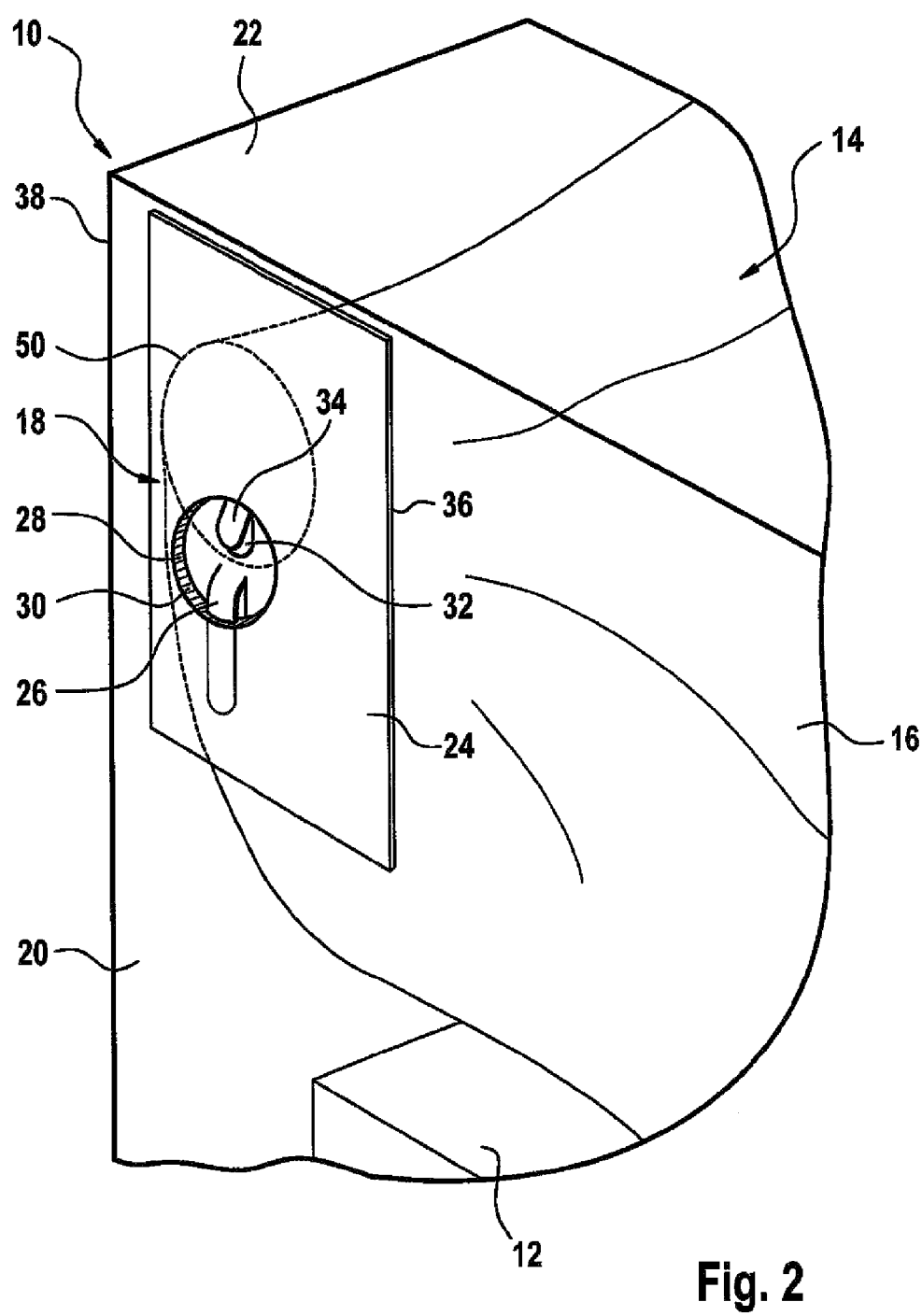
FIG. 2 is a more detailed perspective view of a portion of the container of FIG. 1.

Referring to FIGS. 1 and 2, a container 10 comprises two articles 12 and an inflated dunnage means 14 for filling a void space in container 10. The inflated dunnage means 14 comprises an inflatable dunnage bag 16 and an inflation valve 18 for inflating the dunnage bag 16 with gas, e.g. air. The articles 12 are wedged between the inflated dunnage bag 16 and side walls 20 and top wall 22 of container 10 and between portions of inflated dunnage bag 16. Thus articles 12 are prevented from moving around in container 10 while being shipped.

Inflation valve 18 comprises a card-type solid member 24 made of a flat thin but rigid and rectangular sheet of polyethylene in one step by molding. Solid member 24 comprises a clip- or hook-shape connecting portion 26, and side wall 20 of container 10 has a hole 28 nearby to an upper corner of container 10. Clip- or hook-shape connecting portion 26 is formed during punching or molding of solid member 24 and looks like a punching-out. As can best be seen from FIGS. 2 to 5, clip- or hook-shape connecting portion 26 is pierced downwardly into a circumferential surface 30 of hole 28 such that it penetrates into the substance of the material from which container 10 is made, e.g. corrugated cardboard, to attach solid member 24 very close and parallel to side wall 20 of container 10 and oriented with its longitudinal sides 36 parallel to vertical edges 38 of container 10.

Solid member 24 comprises an inflation opening 32 located nearby connecting portion 26. Inflation opening 32 is also formed when solid member 24 is molded by creating a clip- or hook-shape protrusion 34 of a shape similar to connecting portion 26, however having a shorter length. As may be seen from the figures, inflation opening 32 is located at hole 28, thus allowing inflating dunnage bag 16 from outside of container 10, as will be explained in more detail further below.

Referring now to FIGS. 3 to 8, design and functional principles of inflation valve 18 will be explained in more detail. Solid member 24 comprises a hill-type elevated portion 40 extending out of the plane of solid member 24, which in this preferred embodiment has a circular base area 41 (see FIG. 6-8) and thus is shaped like a volcanic cone. However, it is to be understood that other shapes of the elevated portion are suitable, such as shapes with a rectangular or triangular base area. The elevated portion comprises a top 46 having a circumferential and in this preferred embodiment circular sealing rim 48.

An outer surface 42 of a wall 44 of inflatable dunnage bag 16 is gas-tightly fixed to solid member 24 along a circumferential, circular and line-like sealing area 50, the fixation being realized by welding. As can be seen from FIGS. 3 to 5, sealing area 50 is located at the foot of elevated portion 40 and thus distant from sealing rim 48 at the top 46 of elevated portion 40. It can be further noted from FIGS. 3 to 5 that inflation opening 32 is arranged between sealing area 50 and sealing rim 48, and that in this preferred embodiment the portion of wall 44 of inflatable dunnage bag 16 being located radially inwardly of sealing area 50 is elastically stretched when welding bag 16 to solid member 24 such that its outer surface 42 slightly contacts sealing rim 48. It is to be understood, however, that dunnage means 14 may work also without wall 44 being elastically stretched.

Figure 3:
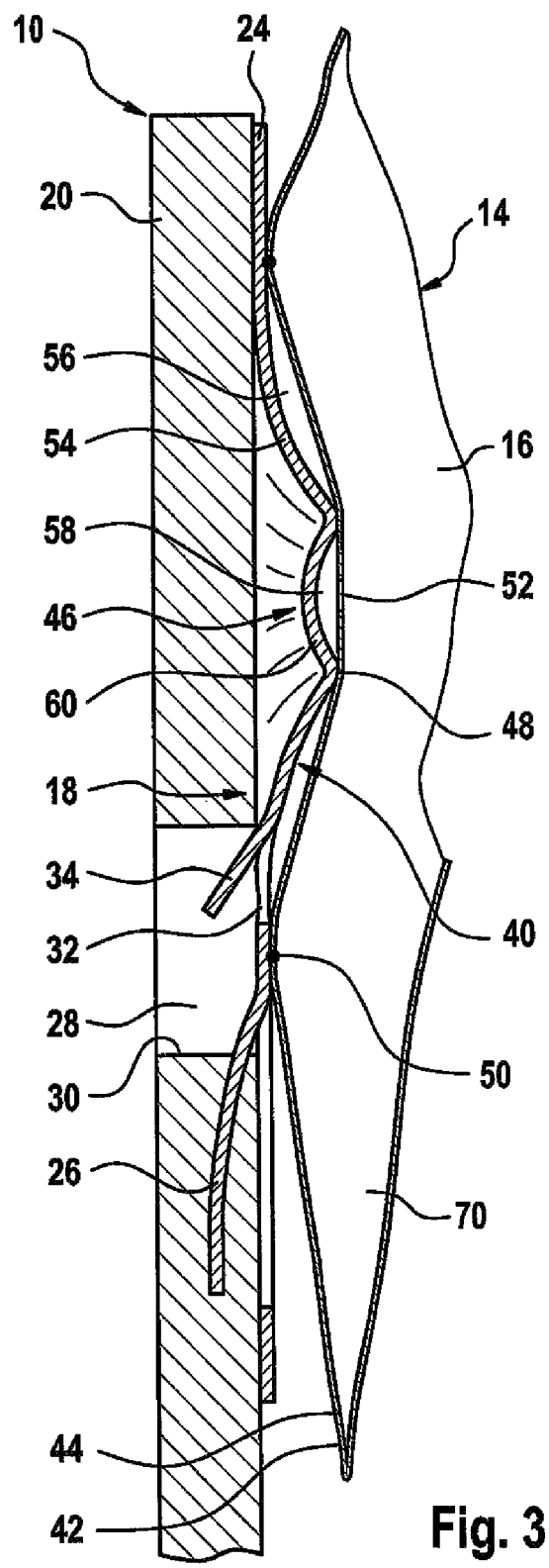
FIG. 3 is a sectional view through the portion shown in FIG. 2, wherein the inflatable dunnage bag is not inflated yet.
Figure 4:
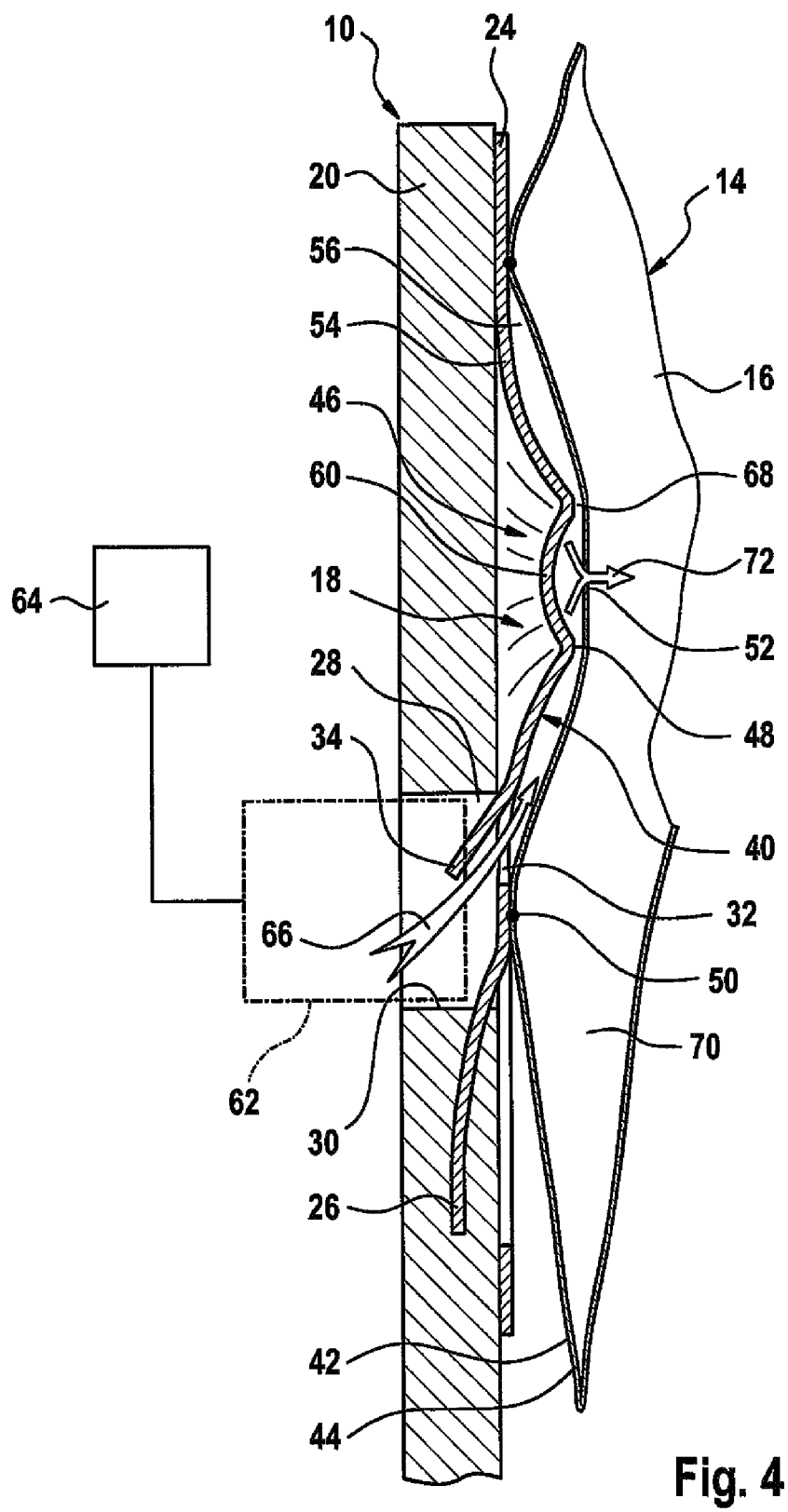
FIG. 4 is a view similar to FIG. 3 during inflation of the inflatable dunnage bag.
Figure 5:
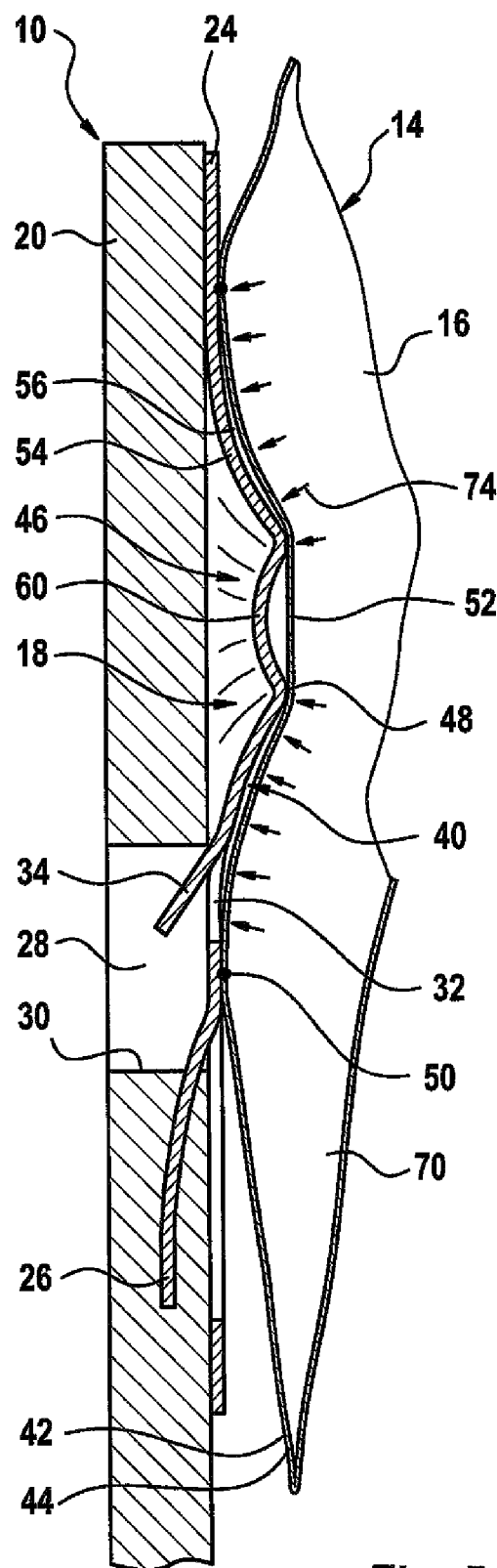
FIG. 5 is a view similar to FIG. 3 after inflation of the inflatable dunnage bag.
Figure 6:
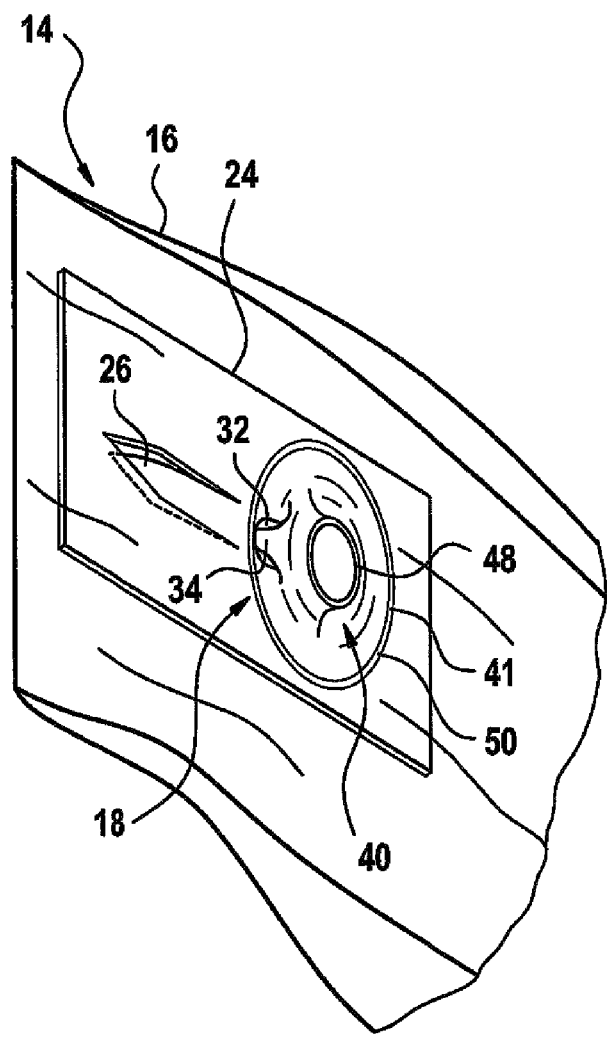
FIG. 6 is a perspective view of the card-type inflation valve and a portion of the inflatable dunnage bag of the previous figures.
Figure 7:
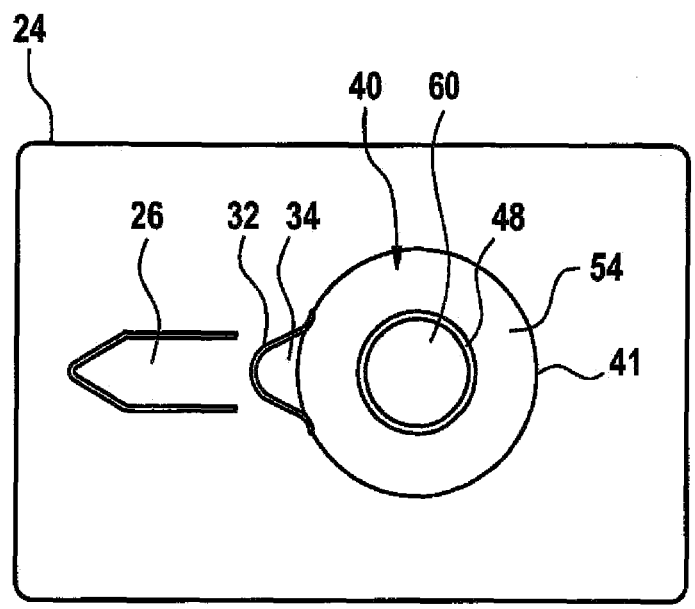
FIG. 7 is a view from above onto the card-type inflation valve, without the inflatable dunnage bag.
Figure 8:
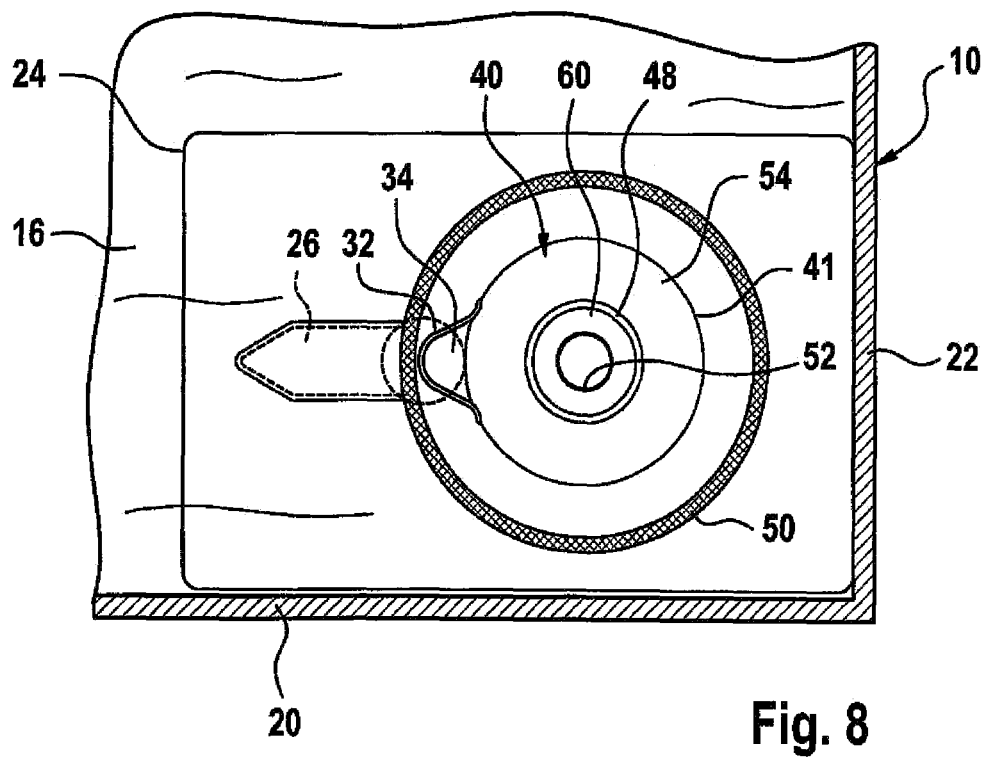
FIG. 8 is a view similar to FIG. 7, with the inflatable dunnage bag attached to the card-type inflation valve.

As can best be seen from FIGS. 3 to 5, wall 44 of dunnage bag 16 comprises an opening 52 being arranged radially inwardly of sealing rim 48 of elevated portion 40. Between outer surface 42 of inflatable dunnage bag 16 and a slope 54 of elevated portion 40 a space 56 is provided, the slope 54 being concavely formed away from outer surface 42 of dunnage bag 16. Similarly, a space 58 is provided between outer surface 42 of dunnage bag 16 and a top surface 60 of elevated portion 40, top surface 60 being arranged radially inwardly of sealing rim 48 and concavely formed away from outer surface 42 of dunnage bag 16.

FIG. 3 shows dunnage means 14 after being fixed to side wall 20 of container 10 by piercing clip-shape connecting portion 26 into inner circumferential surface 30 of hole 28, but prior to inflation.

For filling dunnage bag 16 with gas, e.g. air, a gas supply nozzle 62 is introduced into hole 28, as shown in FIG. 4.

Gas supply nozzle 62 is connected to a gas supply 64. When gas supply 64 is activated, gas flows through gas supply nozzle 62 and inflation opening 32 provided in solid member 24 into space 56 between slope 54 and wall 44 of dunnage bag 16, as is indicated by arrow 66. The increasing pressure in this area elastically lifts outer surface 42 of dunnage bag 16 from sealing rim 48, such that gas can pass through a developing gap 68 between outer surface 42 and sealing rim 48 and further through opening 52 into inner volume 70 of dunnage bag 16, thus inflating dunnage bag 16, as indicated by arrow 72.

When gas supply 64 is deactivated, as shown in FIG. 5, the elastic tension of wall 44 of dunnage bag 16 and the gas pressure inside dunnage bag 16 press wall 44 of dunnage bag 16 onto sealing rim 48, as indicated by arrows 74, thus reliably sealing the inner volume 70 of dunnage bag 16 against the outer atmosphere.

Figure 9:
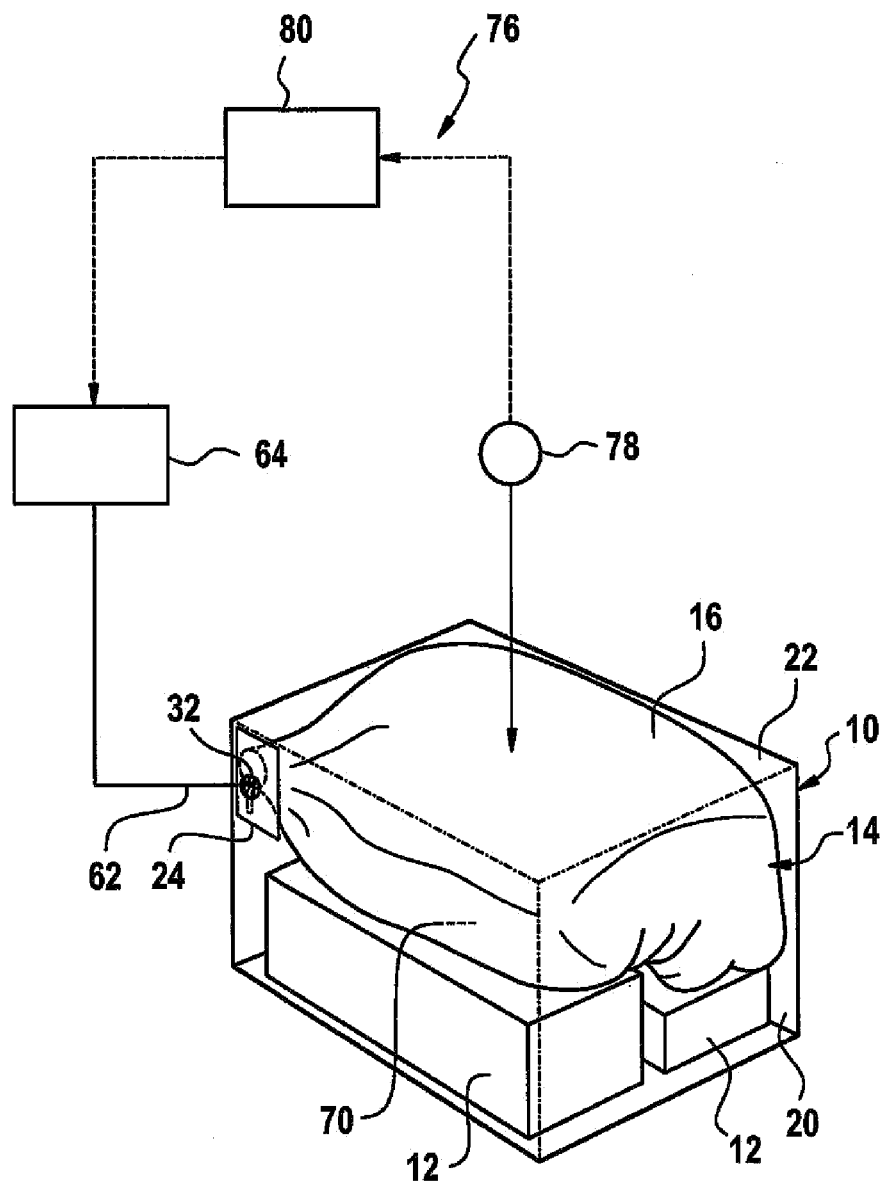
FIG. 9 is a perspective view similar to FIG. 1 showing the principles of a method for the inflation of the inflatable dunnage means.

A particularly advantageous method to use dunnage means 14 is now explained with reference to FIG. 9: The method uses a dunnage inflation device 76 comprising gas supply 64 and gas supply nozzle 62 as shown before, and additionally measuring means 78 for measuring a displacement of top wall 22 of container 10 during inflation of inflatable dunnage bag 16. Measuring means 78 may comprise an ultrasonic, an infrared, a laser measurement device or any other device to reliably measure a displacement of a wall during inflating dunnage bag 16. It is to be understood that the displacement to be measured is the one created by the inflation of dunnage bag 16 and the resulting expansion of container 10. This displacement is usually a displacement orthogonal to a wall 20 or 22 of container 10, and this displacement is supposed to be maximum in the center of a surface, in particular of top wall 22. Thus, the measurement precision is maximum when the displacement of a center of a surface is measured.

Void filling device 76 further comprises a control unit 80 receiving measurement signals from measuring means 78, and providing control signals to gas supply 64. Control unit 80 comprises storage means for storing a predetermined maximum allowable value of displacement during inflation. In an non-shown embodiment, control unit 80 comprises means for determining the maximum allowable displacement value depending on actual parameters of container 10 (e.g. its size and shape) and/or on other parameters.

For filling a void space in a container 10 with dunnage means 14, container 10 is filled with articles 12, dunnage means 14 is fixed to container 10 as explained above, and container 10 is closed and placed such that measuring means 78 can measure the displacement at the center of the surface of top wall 22. Thereafter, gas supply nozzle 62 is connected to hole 28 or inflation opening 32, respectively, and control unit 80 is activated, for example by pushing a switch at gas supply nozzle 62. Control unit 80 then automatically activates gas supply 64 such that gas, e.g. air is fed into inner volume 70 of dunnage bag 16, as explained above. Control unit 80 comprises a monitoring circuit measuring the gas pressure at the exit of gas supply nozzle 62 and thus detecting if gas supply nozzle 62 is not tightly attached to inflation opening 32. In such a case, a warning signal is output and gas supply 64 is deactivated.

During inflation, dunnage bag 16 placed in the closed inner volume of container 10 expands and comes into contact with side walls 20 and top wall 22 of container 10, thus exerting a pressure force onto walls 20 an 22, the direction of which being essentially orthogonal to walls 20 and 22. This pressure force increases with the amount of filling and leads to an outwardly oriented displacement of walls 20 and 22, the displacement only of top wall 22 being contactlessly measured by measuring means 78. As soon as the measured displacement of this single wall reaches the predetermined limit value, which is selected such that the void space is sufficiently filled without damaging articles 12 or container 10, control unit 80 deactivates gas supply 64 and outputs a signal indicating to a user that filling the void space inside container 10 has been successfully completed.

The invention claimed is:

1. Dunnage for filling a void space in a container, comprising an inflatable dunnage bag and an inflation valve for inflating the dunnage bag with a gas, the inflation valve comprising a solid member, characterized in that the solid member comprises an elevated portion forming a valve seat cooperating with a movable valve element formed by a portion of a wall of the inflatable dunnage bag.

2. The dunnage of claim 1, wherein a top surface of the elevated portion is concavely formed away from the outer surface of the inflatable dunnage bag.

3. The dunnage of claim 1, wherein the elevated portion is shaped like a volcanic cone.

4. The dunnage of claim 1, wherein the solid member is thin, flat, and rectangular.

5. The dunnage of claim 1, wherein the solid member comprises a connecting portion for fixing the solid member to a wall of the container.

6. The dunnage of claim 5, wherein the connecting portion comprises a hook or clip to be pricked into the substance of the corrugated board of the container.

7. The dunnage of claim 5, wherein at least one of the connecting portion and the inflation opening is formed when the solid member is fabricated by at least one of molding and punching.

8. The dunnage of claim 1, wherein the inflatable dunnage bag has a shape with at least one corner when not inflated, the solid member being fixed to the inflatable dunnage bag adjacent to the corner of the inflatable dunnage bag.

9. The dunnage of claim 1, wherein at least one of the solid member and the inflatable dunnage bag is made of polyethylene.

10. Dunnage for filling a void space in a container, comprising an inflatable dunnage bag and an inflation valve for inflating the dunnage bag with a gas, the inflation valve comprising a solid member comprising an elevated portion forming a valve seat cooperating with a movable valve element formed by a portion of a wall of the inflatable dunnage bag,
wherein an outer surface of the inflatable dunnage bag being tightly fixed to the solid member along a circumferential sealing area being distant from the top of the elevated portion, the top of the elevated portion comprising a circumferential sealing rim, which is tightly contactable by the outer surface of the inflatable dunnage bag, the solid member comprising an inflation opening arranged between the sealing area and the sealing rim, and a wall of the dunnage bag comprising an opening being arranged radially inwardly of the sealing rim.

11. The dunnage of claim 10, wherein a space is provided between the outer surface of the inflatable dunnage bag and a slope of the elevated portion.

12. The dunnage of claim 11, wherein the slope of the elevated portion is concavely formed away from the outer surface of the inflatable dunnage bag.

13. The dunnage of claim 10, wherein the sealing area is arranged adjacent to a foot of the elevated portion.

14. The dunnage of claim 10, wherein the sealing area is a circular line.

15. The dunnage of claim 10, wherein the outer surface of the inflatable dunnage bag is sealedly fixed to the solid member along a circumferential sealing area by welding.

16. A method for filling a void space in a container, wherein the method comprises:
placing dunnage having an inflatable dunnage bag and an inflation valve for inflating the dunnage bag with a gas inside the container;

closing the container;
feeding a gas to the inflation opening in order to fill the inflatable dunnage bag with the gas;
providing a hole in a wall of the container;
connecting the inflation valve of the dunnage at the hole of the container to the container such that an inflation opening of the inflation valve is located at the hole,
wherein the inflation valve comprises a solid member having an elevated portion forming a valve seat cooperating with a movable valve element formed by a portion of a wall of the inflatable dunnage bag.

17. A method for filling a void space in a container, wherein the method comprises:
placing dunnage having an inflatable dunnage bag and an inflation valve for inflating the dunnage bag with a gas inside the container;
closing the container;
feeding a gas to the inflation opening in order to fill the inflatable dunnage bag with the gas;
providing a hole in a wall of the container;
connecting the inflation valve of the dunnage at the hole of the container to the container such that an inflation opening of the inflation valve is located at the hole,
wherein the method further comprises:
while feeding a gas to the inflation opening, measuring a displacement of a wall of the container;
stopping feeding the gas when the measured displacement reaches a predetermined value;
the displacement being measured using one of ultrasound, infrared, and laser distance measurement.

18. The method of claim 17, wherein a displacement of a top surface of the container is measured.

19. The method of claim 17, wherein connecting the inflation valve with the container comprises pricking a hook arranged at the inflation valve into a substance of a material of the container, preferably into an edge of the hole.

* * * * *